(12) United States Patent
Iino

(10) Patent No.: US 6,817,563 B2
(45) Date of Patent: Nov. 16, 2004

(54) RECORDING TAPE CARTRIDGE

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 18 days.

(21) Appl. No.: 10/298,538

(22) Filed: Nov. 19, 2002

(65) Prior Publication Data

US 2003/0094526 A1 May 22, 2003

(30) Foreign Application Priority Data

Nov. 20, 2001 (JP) ........................................ 2001-354879

(51) Int. Cl.[7] .............................................. G11B 23/107
(52) U.S. Cl. ...................................... 242/348; 360/132
(58) Field of Search ............................. 242/337, 337.1, 242/338, 338.4, 344, 348, 348.2, 912; 360/132

(56) References Cited

U.S. PATENT DOCUMENTS

| | | | |
|---|---|---|---|
| 5,400,981 A | * | 3/1995 | Rambosek et al. ......... 242/348 |
| 6,299,088 B1 | * | 10/2001 | Rambosek .................. 360/132 |
| 6,304,416 B1 | | 10/2001 | McAllister et al. |
| 6,481,658 B1 | * | 11/2002 | Shiga et al. ................ 242/348 |
| 2003/0156356 A1 | * | 8/2003 | Argumedo et al. ......... 360/132 |

* cited by examiner

Primary Examiner—John M. Jillions
(74) Attorney, Agent, or Firm—Sughrue Mion, PLLC

(57) ABSTRACT

A recording tape cartridge is provided in which an inclined wall is formed at a rear end side of a lower case in a direction of loading into a drive device, and a non-contact-type memory board, which stores generation information such as a storage capacity or the like, is mounted along an inner surface of the inclined wall. Even if an inclined supporting mount or the like is not provided within a case, the memory board is set at an incline. By setting the memory board at an incline in this way, information can be recorded or read from a rear surface side and a bottom surface side of the case. Because there is no need for a supporting mount or the like, a structure of the case is simple and it is unlikely for obstacles to electromagnetic waves to arise.

27 Claims, 8 Drawing Sheets and on which a large amount of information can be recorded.
RECORDING TAPE CARTRIDGE

BACKGROUND OF THE INVENTION

1. Field of the Invention

The present invention relates to a recording tape cartridge which rotatably accommodates a single reel on which a recording tape, such as a magnetic tape or the like, is wound.

2. Description of the Related Art

Recording tapes, such as magnetic tapes and the like, are used as external recording media for computers and the like. A magnetic tape cartridge is used to accommodate a single reel on which is wound a magnetic tape which serves as a recording tape, and which requires little space for storage, As shown in FIGS. 7 and 8, a memory board 24 is built-into a rear surface 68A of a magnetic tape cartridge 68, which rear surface 68A is at the rear end side in the loading direction. The memory board 24 is for identification, at a drive device, of the recording capacity or the recording format or the like (hereinafter, the "generation") of the magnetic tape cartridge 68, or is for the writing of respective information.

The memory board 24 is adhered to a supporting mount 70, which is formed at a corner portion and is inclined by 45°, such that reading and writing can be carried out at a reading device 62 and a reading/writing device 64 from the side of the rear surface 68A and from the side of a bottom surface 68B of the magnetic tape cartridge 68.

The reason why the memory board 24 is provided at an angle in this way is as follows. When the magnetic tape cartridge 68 is removed from an accommodating rack of a library 38 (see FIG. 3) and loaded into a drive device, the reading device 62, which is provided at a robot finger, is structured such that it can access the magnetic tape cartridge 68 accommodated in the accommodating rack from the rear surface side of the magnetic tape cartridge 68, or the reading/writing device 64, which is provided at the drive device, is disposed such that it can only access the magnetic tape cartridge 68 from the bottom surface side thereof due to structural constraints of the mechanism for fetching the magnetic tape cartridge 68.

However, in the aforementioned structure for mounting the memory board 24, the supporting mount 70, which is not essential to the basic functions of the magnetic tape cartridge 68, must be formed and the memory board 24 must be adhered and fixed thereto. Further, there is the concern that the supporting mount 70 will hinder the electromagnetic waves which are transmitted and received at the reading device 62 and the reading/writing device 64, and that errors in reading and writing will arise.

SUMMARY OF THE INVENTION

In view of the foregoing, an object of the present invention is to provide a recording tape cartridge in which a structure for mounting a memory board is simple, and in which it is unlikely for obstacles to electromagnetic waves to arise.

One aspect of the present invention is a recording tape cartridge, which is loaded into a drive device from a predetermined direction and used for at least one of recording and reading information, the recording tape cartridge comprising: a substantially rectangular case which rotatably accommodates a reel on which a recording tape is wound; an inclined wall formed at the case at a rear end side of the case in a direction of loading the case into the drive device, one surface of the inclined wall forming an outer surface of the case; and a memory which is mounted to another surface of the inclined wall, which another surface is at an inner surface side of the case, and which stores predetermined information, and at which at least one of recording of information and reading of information is possible from an exterior of the case.

In the above-described structure, the inclined wall is formed at the rear end side of the case in the direction of loading the case into a drive device. A non-contact-type memory, which stores generation information such as the storage capacity or the like, is mounted along the inner surface of the inclined wall. In this way, even if an inclined supporting mount or the like is not provided at the case, the memory is, as a matter of course, set at an incline. By setting the memory at an incline in this way, exchange of information can be carried out from the rear surface side and from the bottom surface side of the case.

Further, because there is no need for an inclined supporting mount or the like, the structure of the case is simple. Moreover, because there is no need for an unnecessary supporting mount or the like, it is unlikely for obstacles to electromagnetic waves to arise. In addition, because the generation information can be read and written in a non-contact manner, there is no need to provide a hole for identification as in the conventional art, and the strength of the case of the recording tape cartridge improves. Still further, because a connection terminal and the like are not exposed as in the case of a conventional contact-type memory, the external appearance of the recording tape cartridge is not adversely affected.

DESCRIPTION OF THE PREFERRED EMBODIMENT

Next, a recording tape cartridge 10 relating to an embodiment of the present invention will be described. Note that, for convenience of explanation, the direction of loading the recording tape cartridge 10 into a drive device 36 is denoted by the arrow in the figures.

Figure 1:
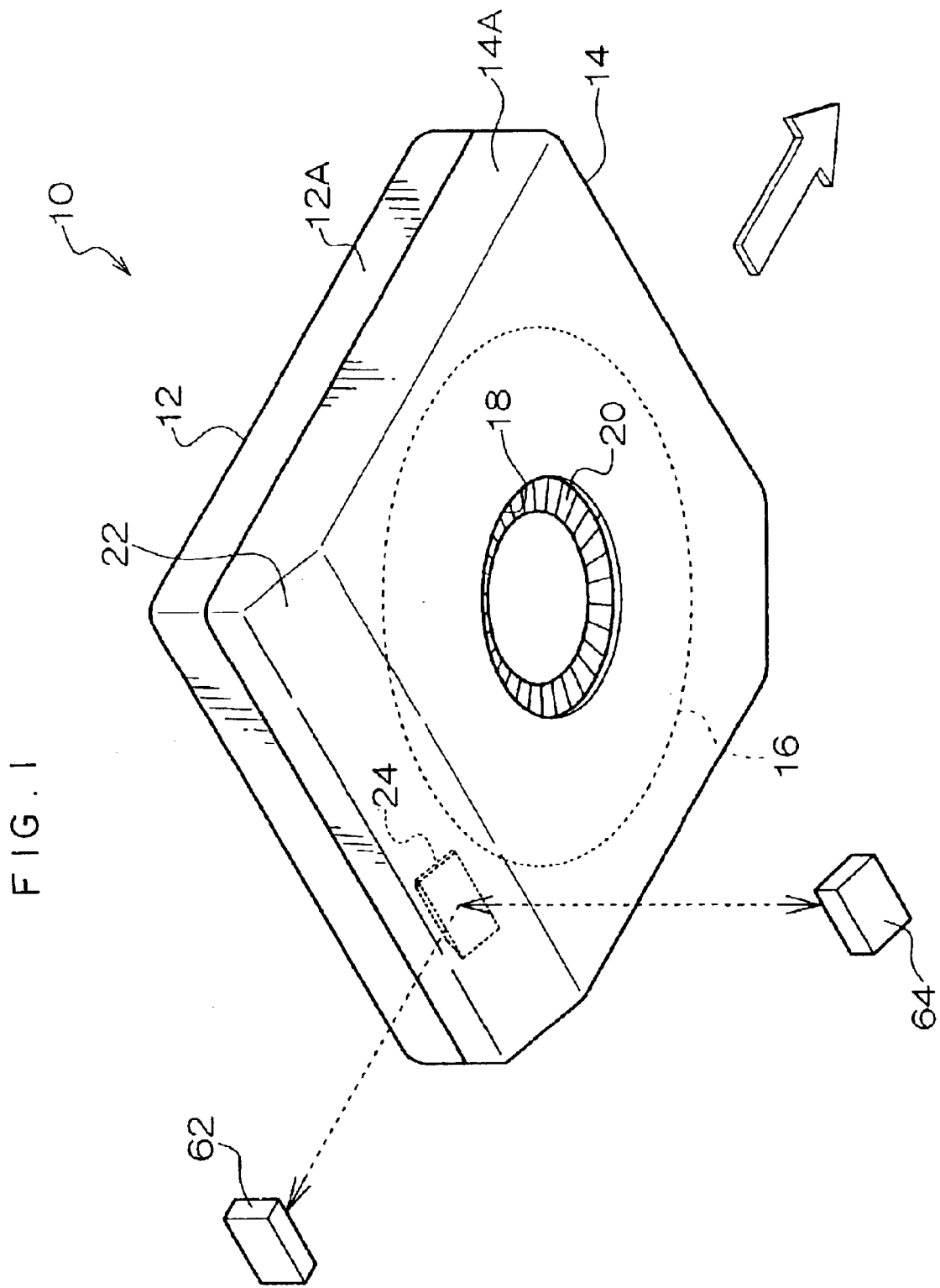
FIG. 1 is a schematic perspective view, as seen from a bottom surface side, of a magnetic tape cartridge.
Figure 2:
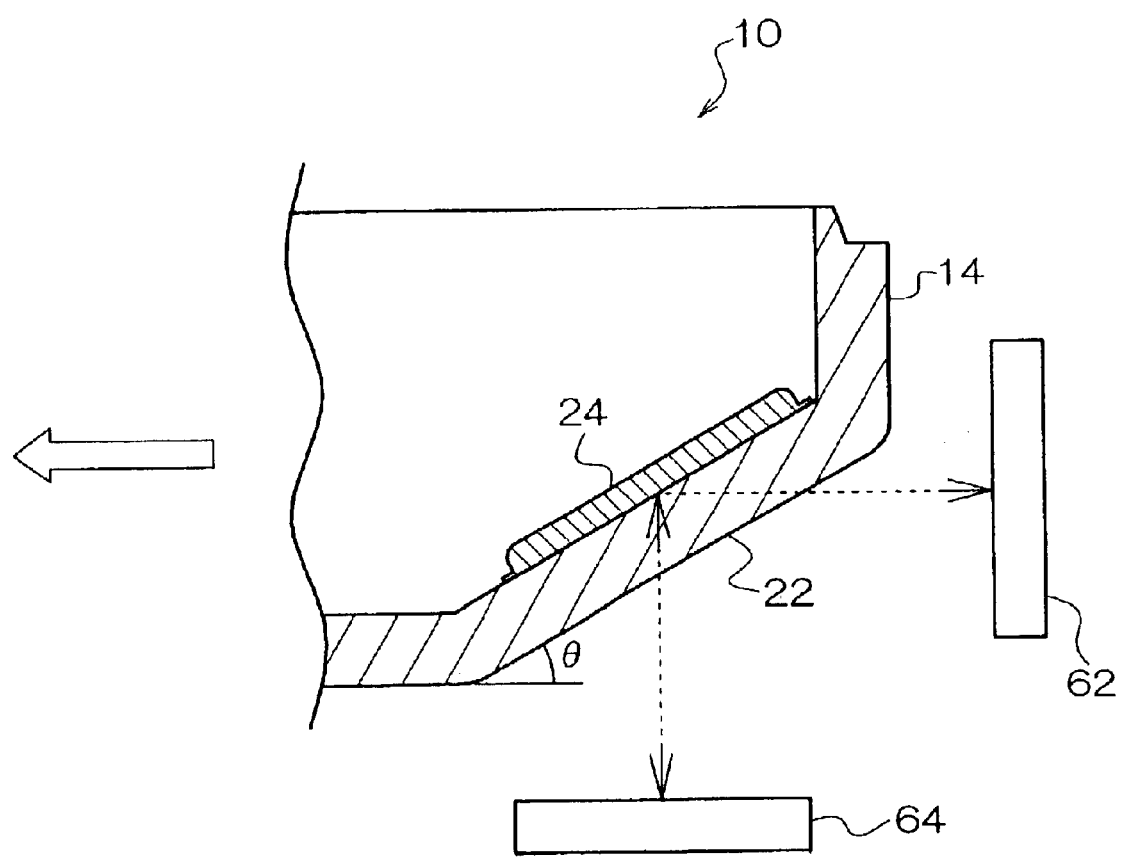
FIG. 2 is a sectional view showing an inclined wall of the magnetic tape cartridge.

As shown in FIG. 1 and FIG. 2, the recording tape cartridge 10 is formed in a substantially rectangular box shape by an upper case 12 and a lower case 14, which are formed of a synthetic resin, being joined together with peripheral walls 12A, 14A thereof abutting one another. A single reel 16, on which is wound a magnetic tape serving as an information recording/playback medium, is rotatably accommodated within the case. A circular aperture 18 is formed in the center of the bottom case 14. A reel gear 20, which is provided in a ring shape at the bottom surface of the reel 16, is exposed from this aperture 18.

An inclined wall 22, which rises from the bottom surface at an angle of inclination θ of 30°, is formed at the rear end side, in the loading direction, of the lower case 14. The substantially rectangular memory board 24 is adhered to the inner surface of the inclined wall 22 along the incline thereof. Generation information, such as at least the type of magnetic tape, the recording capacity, and the like, is electrically stored in the memory board 24. Further individual information can be written in the memory board 24. Information can be read or written, in a non-contact manner, from or into the memory board 24 by electromagnetic waves which are transmitted or received from the reading/writing device 64 provided at the drive device 36.

In this way, by setting the memory board 24 at an incline, the generation information can be read at the reading device 62 which is provided at a robot finger 42 of the library 38 which will be described later, or exchange of information to and from the bottom surface of the recording tape cartridge 10 is possible by the reading/writing device 64 provided at the drive device 36.

Next, the basics of the library 38 will be described.

Figure 3:
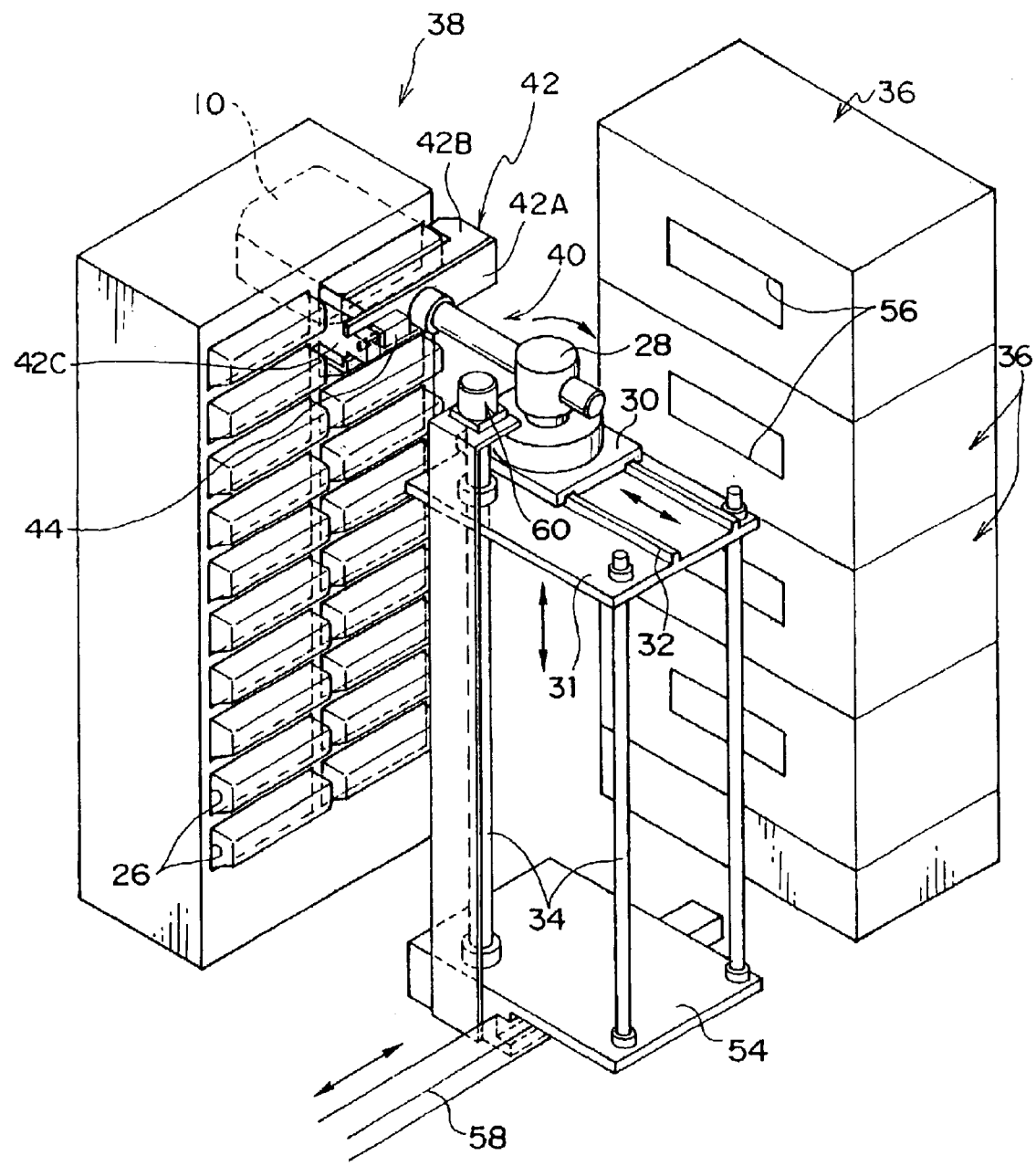
FIG. 3 is a schematic perspective view showing a library and drive devices.
Figure 4:
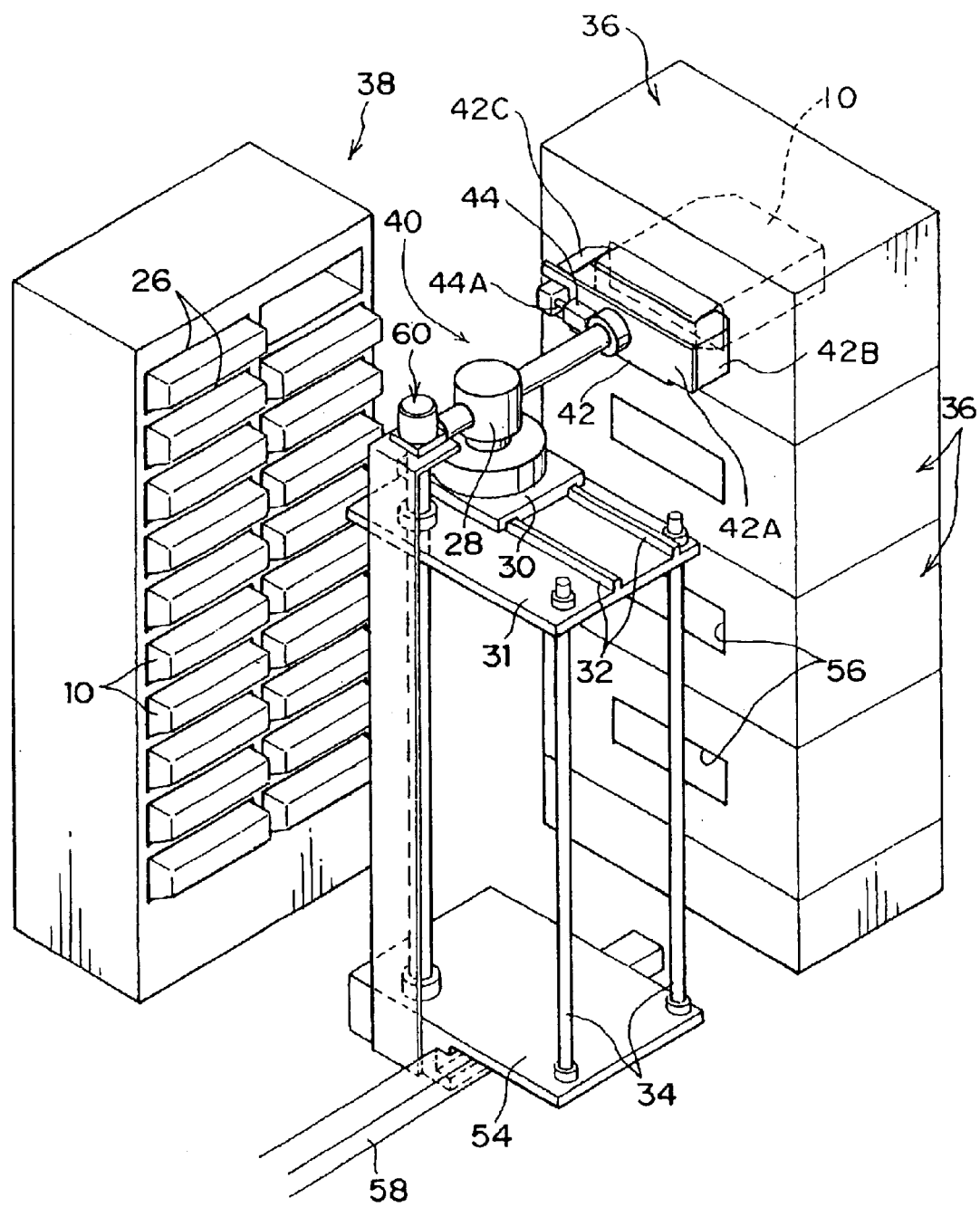
FIG. 4 is a schematic perspective view showing the library and the drive devices.

As shown in FIG. 3 and FIG. 4, the library 38, automatically by a robot arm 40, carries out the operations of loading the recording tape cartridge 10, which is removed from an accommodating rack 26, into a loading opening 56 of the drive device 36, and returning the recording tape cartridge 10, which has been removed from the drive device 36, to the accommodating rack 26.

The robot arm 40 is fixed to a pivoting device 28, and pivots freely between the drive devices 36 and the library 38. The pivoting device 28 is fixed on a base 30. The base 30 is slid on rails 32, which are laid out on a supporting stand 31, by an unillustrated driving means. Further, driving force from a raising/lowering device 60 is transmitted to the supporting stand 31 so as to raise and lower the supporting stand 31 along guide supports 34 which stand erect from a carrier 54. In this way, the robot arm 40 can be moved to the height of the designated accommodating rack 26 or the loading opening 56 of the designated drive device 36.

The carrier 54 moves along rails 58 which are laid out in a direction orthogonal to the rails 32. In this way, the recording tape cartridge 10, which is being grasped by the finger 42 mounted to the distal end of the robot arm 40, is taken out or placed in the accommodating rack 26 or the loading opening 56.

The finger 42 is formed in a substantial U-shape as seen in plan view. One claw portion 42B thereof is formed integrally with and fixed to a supporting portion 42A. Another claw portion 42C is mounted to the distal end of a piston rod 44A of a cylinder 44 mounted to the supporting portion 42A. Due to the piston rod 44A extending and retracting, the peripheral walls of the recording tape cartridge 10 are grasped by the claw portion 42B and the claw portion 42C.

Figure 5:
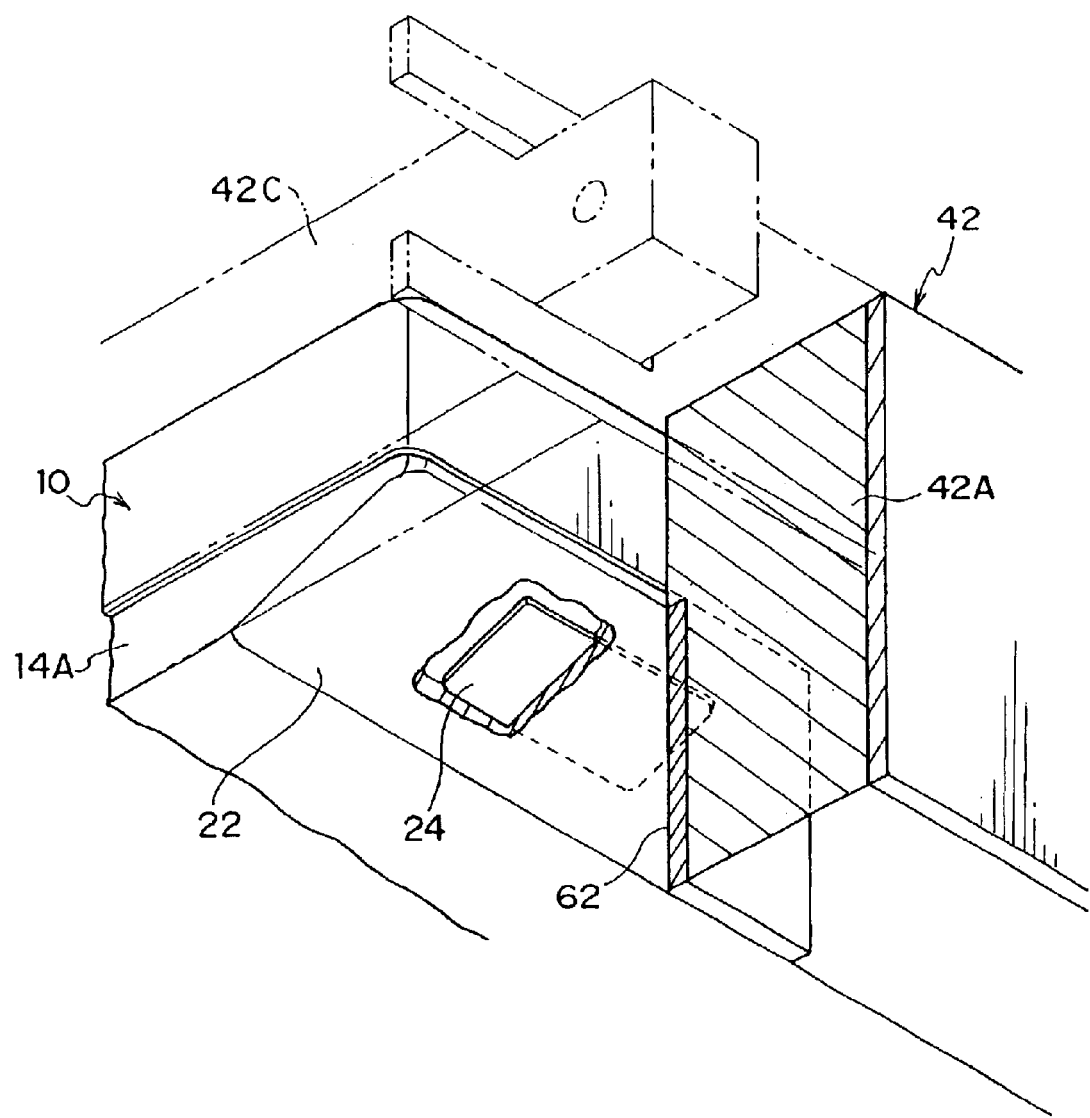
FIG. 5 is a perspective view showing the positional relationship between a memory board and a reading device.

As shown in FIG. 5, the reading device 62 is mounted to the upright-standing surface of the supporting portion 42A. When the finger 42 grasps the recording tape cartridge 10, the reading device 62 comes to a position at which it can receive the electromagnetic waves of the memory board 24 which is mounted to the inner surface of the inclined wall 22 so as to be inclined at an angle of inclination of θ=30°.

Accordingly, as shown in FIG. 5, when the finger 42 grasps, from the rear surface side, the peripheral walls of the recording tape cartridge 10 which is accommodated in the library 38, the reading device 62 receives information from the memory board 24. The recording tape cartridge 10 is taken out from the library 38, and simultaneously, the generation information stored within the memory board 24 can be read. Note that the reading device 62 may be any type provided that it is structured so as to be able to read, in a non-contact manner, the information stored in the memory board 24. Further, the angle of inclination θ is not limited to 30°, and the exchange of information can be carried out if θ is in the range of 30° to 60°.

Figure 6:
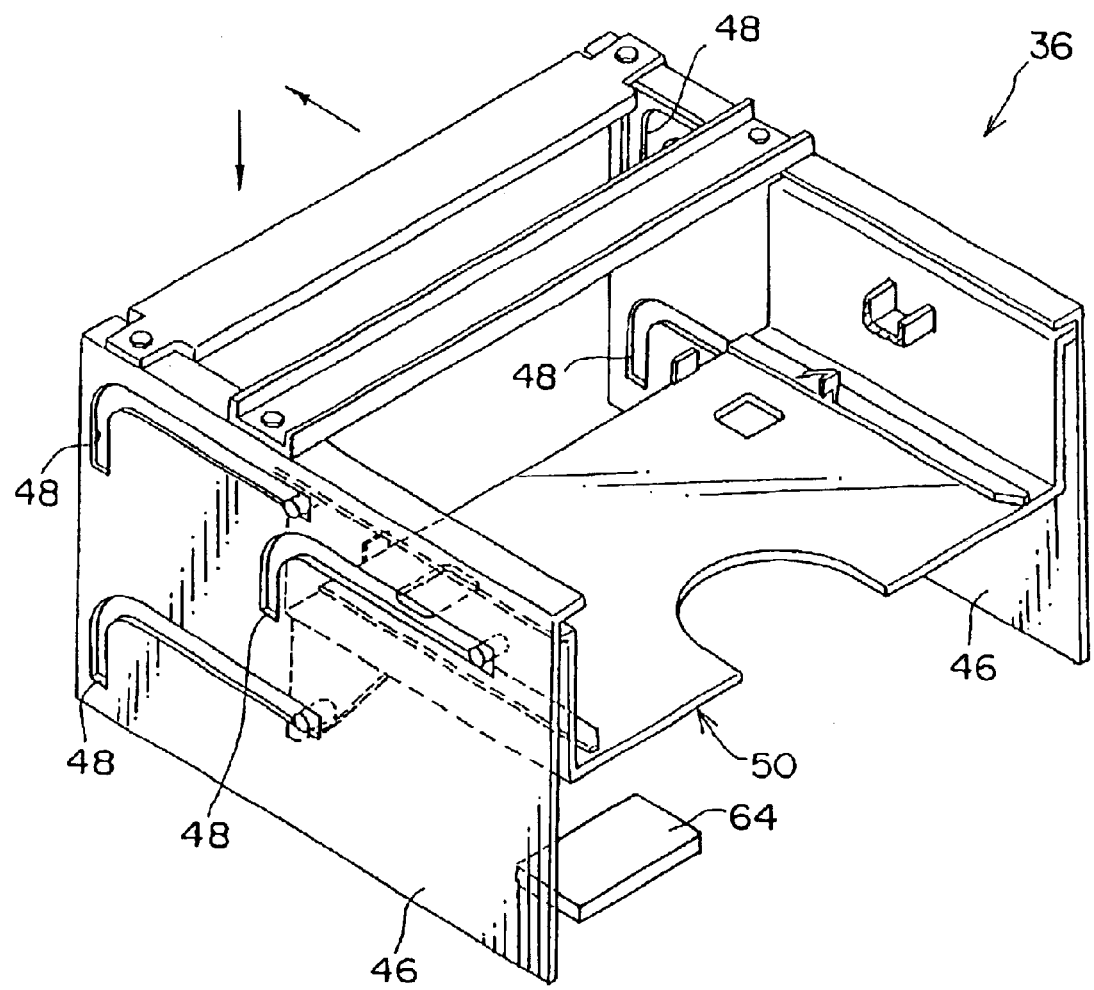
FIG. 6 is a schematic perspective view showing a bucket provided at a drive device.
Figure 7:
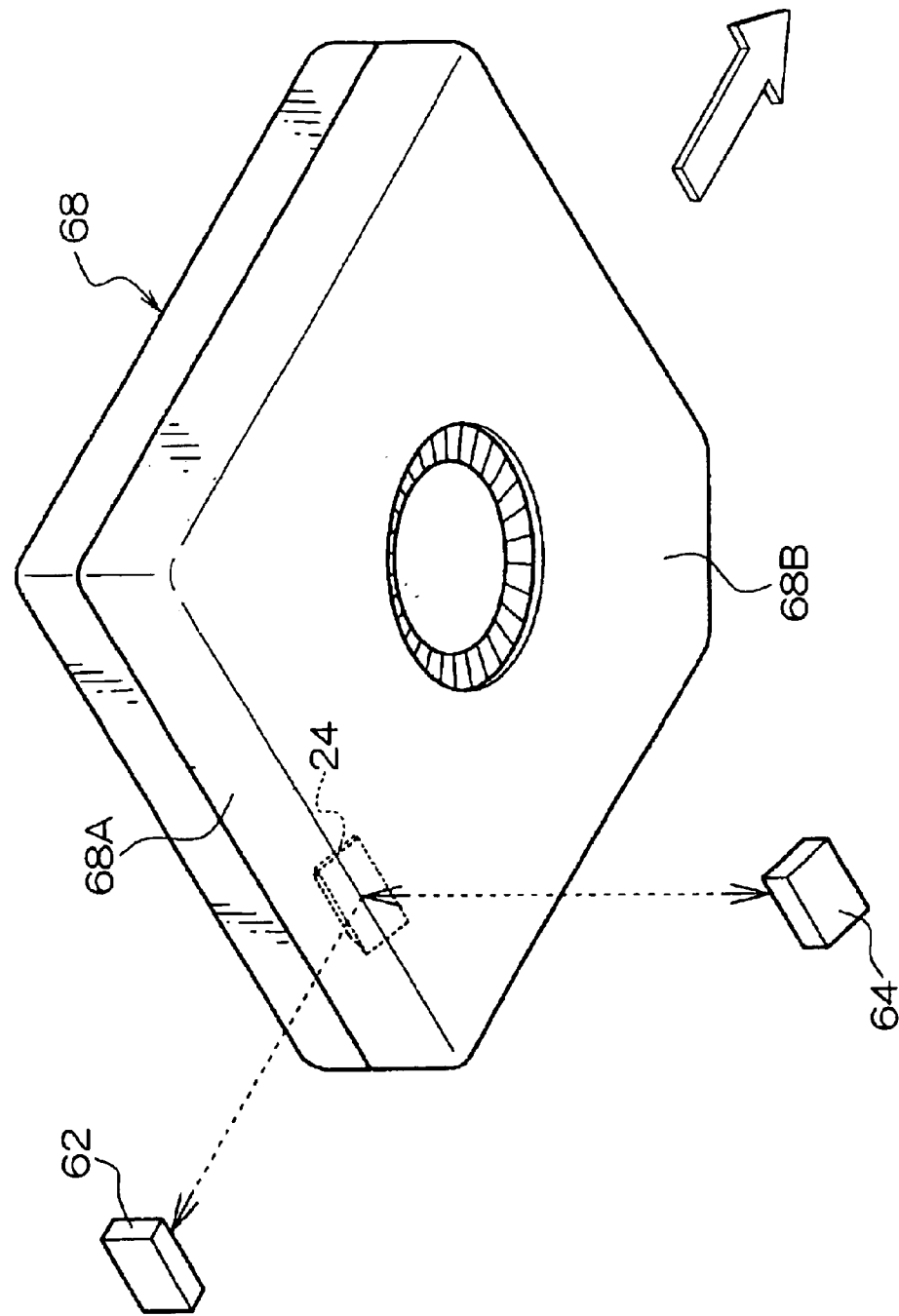
FIG. 7 is a schematic perspective view, as seen from a bottom surface side, of a conventional magnetic tape cartridge.
Figure 8:
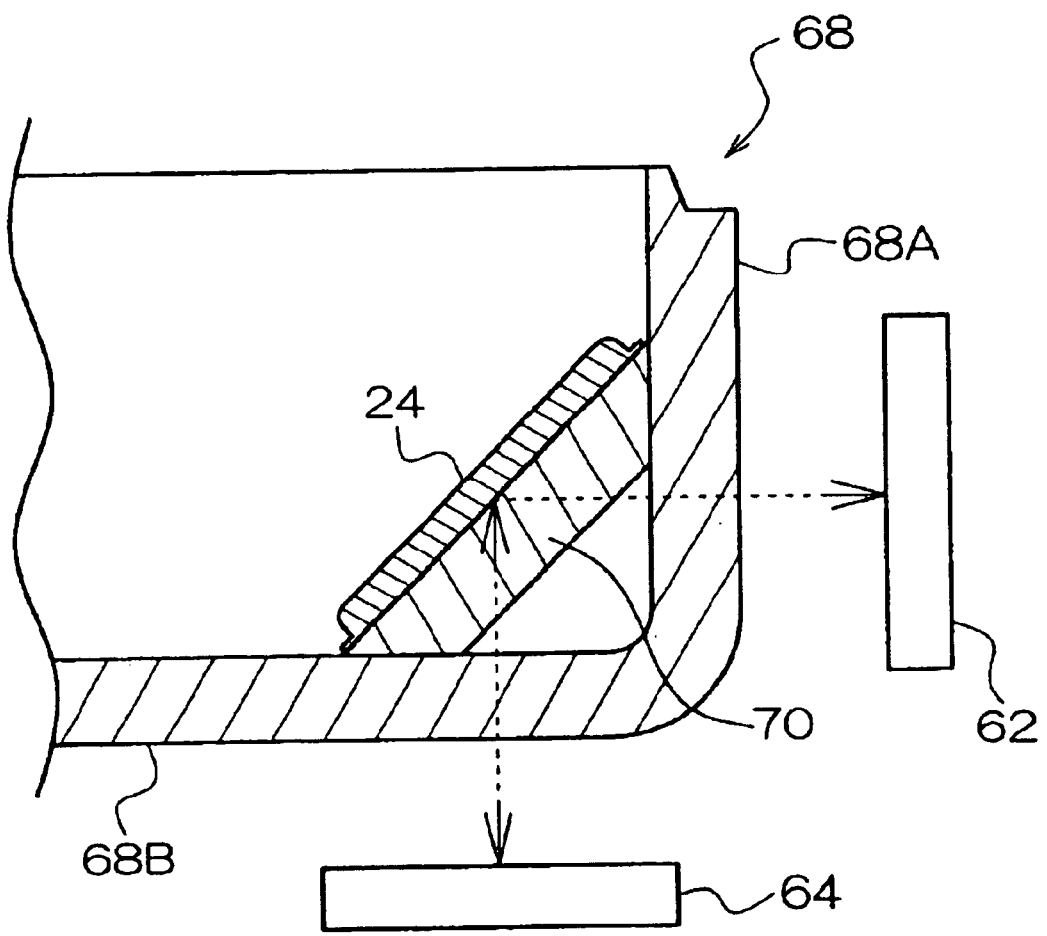
FIG. 8 is a sectional view showing an inclined wall of the conventional magnetic tape cartridge.

FIG. 6 illustrates a bucket 50 of the drive device 36 into which the recording tape cartridge 10, which is grasped by the finger 42, is loaded. When the recording tape cartridge 10 is inserted into the bucket 50, the bucket 50, while being guided by three guide holes 48 which are substantially L-shaped in side view and which are provided in each of both side walls 46 supporting the bucket 50, first moves in the horizontal direction, and then moves downward along the vertical direction. The reel gear 20 of the recording tape cartridge 10 meshes with the driving gear of the drive device 36. In this way, the recording tape cartridge 10 is completely loaded into the drive device 36.

Further, in the state in which the recording tape cartridge 10 is completely loaded in, the reading/writing device 64 is disposed beneath the memory board 24. By the reading/writing device 64, the drive device 36 can identify the generation of the recording tape cartridge 10 or can write individual information into the memory board 24.

In this way, by mounting the memory board 42 directly to the inclined wall 22, obstacles to the electromagnetic waves do not arise, and the necessary information can be reliably obtained from the rear surface side and the bottom surface side of the recording tape cartridge 10.

Because the present invention is structured as described above, the structure for mounting the memory board is simple, and it is unlikely for obstacles to electromagnetic waves to arise.

What is claimed is:

1. A recording tape cartridge, which is loaded into a drive device from a predetermined direction and used for at least one of recording and reading information, the recording tape cartridge comprising:

a substantially rectangular case which rotatably accommodates a reel on which a recording tape is wound;

an inclined wall formed at the case at a rear end side of the case in a direction of loading the case into the drive device, one surface of the inclined wall forming an outer surface of the case; and a memory which is directly mounted to and substantially parallel to another surface of the inclined wall, which another surface is at an inner surface side of the case, and which stores predetermined information, and at which at least one of recording of information and reading of information is possible from an exterior of the case.

2. The recording tape cartridge of claim 1, wherein the predetermined information is generation information of the recording tape cartridge.

3. The recording tape cartridge of claim 1, wherein the predetermined information is at least one of a storage capacity and a storage format of the recording tape cartridge.

4. The recording tape cartridge of claim 1, wherein at least one of recording of information into the memory and reading of information from the memory is carried out in a non-contact manner from the exterior of the case.

5. The recording tape cartridge of claim 1, wherein at least one of recording of information into the memory and reading of information from the memory is carried out by using electromagnetic waves.

6. The recording tape cartridge of claim 1, wherein the case has a rear end surface and a bottom surface, and at least one of recording of information into the memory and reading of information from the memory can be carried out from each of a bottom surface side of the case and a rear end surface side of the case.

7. The recording tape cartridge of claim 1, wherein the case has a rear end surface and a bottom surface, and said one surface of the inclined wall is continuous with the rear end surface and the bottom surface.

8. The recording tape cartridge of claim 7, wherein an angle of inclination of the one surface of the inclined wall with respect to the bottom surface substantially is 30° to 60°.

9. The recording tape cartridge of claim 1, wherein the case accommodates a single reel.

10. The recording tape cartridge of claim 1, wherein:
the predetermined information is at least one of a storage capacity and a storage format of the recording tape cartridge; and
at least one of recording of information into the memory and reading of information from the memory is carried out in a non-contact manner from the exterior of the case.

11. The recording tape cartridge of claim 8, wherein:
the case accommodates a single reel;
at least one of recording of information into the memory and reading of information from the memory is carried out in a non-contact manner from the exterior of the case; and
the angle of inclination of the one surface of the inclined wall with respect to the bottom surface is substantially 30°.

12. The recording tape cartridge of claim 1, wherein the one surface and the another surface of the inclined wall are substantially parallel with respect to one another.

13. The recording tape cartridge of claim 1, wherein the case as an upper case portion and a lower case portion, the inclined wall being at a rear end side of the lower case portion, and
wherein the lower case portion further comprises a second wall portion the second wall portion being positioned between the inclined wall and the upper case portion such that the second wall portion is extended from the inclined wall at an angle which is different than an angle of inclination of the inclined wall.

14. The recording tape cartridge of claim 13, wherein the second wall portion is extended vertically from the inclined wall.

15. The recording tape cartridge of claim 13, wherein the second wall portion is terminated at an area of abutment between the lower case portion and the upper case portion.

16. A recording tape cartridge driving system comprising:
a recording tape cartridge, which is loaded into a drive device from a predetermined direction and used for at least one of recording and reading information, which recording tape cartridge includes a memory that stores predetermined information, and at which at least one of recording of information and reading of information is possible from an exterior of the case;
the drive device for driving the recording tape cartridge so as to carry out at least one of reading information from and recording information on the recording tape cartridge, the drive device having a reading device for reading the predetermined information from the memory; and
a library device including a robot arm for carrying out an operation of loading the recording tape cartridge into the drive device and removing the recording tape a cartridge from the drive device, the robot arm having another reading device for reading the predetermined information from the memory,
wherein the reading device of the drive device accesses the recording tape cartridge from a bottom surface side of the recording tape cartridge, and the another reading device of the robot arm accesses the recording tape cartridge from a rear surface side of the recording tape cartridge with respect to the predetermined direction of loading,
and wherein the recording tape cartridge comprises:
a substantially rectangular case which rotatably accommodates a reel on which a recording tape is wound;
an inclined wall formed at the case at a rear end side of the case in the predetermined direction of loading the case into the drive device, one surface of the incline wall forming an outer surface of the case; and
the memory which is directly mounted to and substantially parallel to another surface of the inclined wall, which another surface is at an inner surface side of the case.

17. The recording tape cartridge of claim 16, wherein the predetermined information is generation information of the recording tape cartridge.

18. The recording tape cartridge of claim 16, wherein the predetermined information is at least one of a storage capacity and a storage format of the recording tape cartridge.

19. The recording tape cartridge of claim 16, wherein at least one of recording of information into the memory and reading of information from the memory is carried out in a non-contact manner from the exterior of the case.

20. The recording tape cartridge of claim 16, wherein at least one of recording of information into the memory and reading of information from the memory is carried out by using electromagnetic waves.

21. The recording tape cartridge of claim 16, wherein the case has a rear end surface and a bottom surface, and at least one of recording of information into the memory and reading of information from the memory can be carried out from each of a bottom surface side of the case and a rear end surface side of the case.

22. The recording tape cartridge of claim 16, wherein the case has a rear end surface and a bottom surface, and said one surface of the inclined wall is continuous with the rear end surface and the bottom surface.

23. The recording tape cartridge of claim 22, wherein an angle of inclination of the one surface of the inclined wall with respect to the bottom surface substantially is 30° to 60°.

24. The recording tape cartridge of claim 16, wherein the case accommodates a single reel.

25. The recording tape cartridge of claim 16, wherein:
the predetermined information is at least one of a storage capacity and a storage format of the recording tape cartridge; and
at least one of recording of information into the memory and reading of information from the memory is carried out in a non-contact manner from the exterior of the case.

26. The recording tape cartridge of claim 23, wherein:
the case accommodates a single reel;
at least one of recording of information into the memory and reading of information from the memory is carried out in a non-contact manner from the exterior of the case; and
the angle of inclination of the one surface of the inclined wall with respect to the bottom surface is substantially 30°.

27. The recording tape cartridge of claim 16, wherein the one surface and the another surface of the inclined wall are substantially parallel with respect to one another.

* * * * *